United States Patent
Qing et al.

(10) Patent No.: US 10,789,628 B2
(45) Date of Patent: Sep. 29, 2020

(54) BLOCKCHAIN-BASED BILL NUMBER ALLOCATION METHOD, APPARATUS AND ELECTRONIC DEVICE

(71) Applicant: Alibaba Group Holding Limited, George Town (KY)

(72) Inventors: Longsheng Qing, Hangzhou (CN); Zhen Sun, Hangzhou (CN); Xueqing Yang, Hangzhou (CN); Ge Jin, Hangzhou (CN); Zhenzhong Meng, Hangzhou (CN); Yu Chu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/783,094

(22) Filed: Feb. 5, 2020

(65) Prior Publication Data

US 2020/0234351 A1 Jul. 23, 2020

Related U.S. Application Data

(63) Continuation of application No. PCT/CN2020/072202, filed on Jan. 15, 2020.

(30) Foreign Application Priority Data

Jul. 31, 2019 (CN) .......................... 2019 1 0703787

(51) Int. Cl.
*G06Q 30/04* (2012.01)
*G06F 16/23* (2019.01)
(Continued)

(52) U.S. Cl.
CPC ......... *G06Q 30/04* (2013.01); *G06F 16/2365* (2019.01); *G06F 16/2379* (2019.01);
(Continued)

(58) Field of Classification Search
CPC ..... G06Q 30/04; G06Q 20/065; G06Q 20/401
See application file for complete search history.

(56) References Cited

U.S. PATENT DOCUMENTS

| 5,892,900 A | 4/1999 | Ginter et al. |
| 2003/0126048 A1 | 7/2003 | Hollar et al. |

(Continued)

FOREIGN PATENT DOCUMENTS

| CN | 106952094 | 7/2017 |
| CN | 108305106 | 7/2018 |

(Continued)

OTHER PUBLICATIONS

U.S. Appl. No. 16/779,173, Jin et al., filed Jan. 31, 2020.
(Continued)

*Primary Examiner* — A. Hunter Wilder
(74) *Attorney, Agent, or Firm* — Fish & Richardson P.C.

(57) ABSTRACT

In an implementation of a computer-implemented method, a target transaction sent by a billing initiator is received, where the target transaction includes bill information of an e-bill to be issued. In response to the target transaction, check logic is invoked in a smart contract deployed in a blockchain network, and a validity check is performed on the bill information. If the validity check succeeds, allocation logic is invoked in the smart contract, and an e-bill number is allocated to the bill information from available e-bill number segments maintained in a blockchain account corresponding to a biller of the e-bill.

12 Claims, 7 Drawing Sheets

(51) Int. Cl.
  *G06Q 10/10* (2012.01)
  *G06F 40/186* (2020.01)
  *G06Q 30/00* (2012.01)
  *H04L 29/06* (2006.01)
  *G06Q 20/40* (2012.01)
  *G06Q 20/06* (2012.01)

(52) U.S. Cl.
  CPC .......... *G06F 40/186* (2020.01); *G06Q 10/10* (2013.01); *G06Q 20/401* (2013.01); *G06Q 30/0185* (2013.01); *H04L 63/102* (2013.01); *G06Q 20/065* (2013.01)

(56) References Cited

U.S. PATENT DOCUMENTS

| | | |
|---|---|---|
| 2004/0088255 A1 | 5/2004 | Zielke et al. |
| 2008/0040265 A1 | 2/2008 | Rackley, III et al. |
| 2010/0030675 A1 | 2/2010 | Hanan et al. |
| 2013/0138570 A1 | 5/2013 | Ross |
| 2014/0052641 A1 | 2/2014 | Chai et al. |
| 2015/0310476 A1 | 10/2015 | Gadwa |
| 2017/0004550 A1 | 1/2017 | Shaaban et al. |
| 2018/0075536 A1 | 3/2018 | Jayaram et al. |
| 2019/0080284 A1 | 3/2019 | Kim et al. |
| 2019/0205884 A1 | 7/2019 | Batra et al. |
| 2020/0042960 A1 | 2/2020 | Cook et al. |

FOREIGN PATENT DOCUMENTS

| | | |
|---|---|---|
| CN | 109560916 | 4/2019 |
| CN | 109670879 | 4/2019 |
| CN | 109949111 | 6/2019 |
| CN | 110020901 | 7/2019 |
| CN | 110046945 | 7/2019 |
| CN | 110060112 | 7/2019 |
| CN | 110458631 | 11/2019 |

OTHER PUBLICATIONS

U.S. Appl. No. 16/779,198, Sun et al., filed Jan. 31, 2020.
U.S. Appl. No. 16/779,511, Yang et al., filed Jan. 31, 2020.
U.S. Appl. No. 16/783,075, Yang et al., filed Feb. 5, 2020.
U.S. Appl. No. 16/783,098, Meng et al., filed Feb. 5, 2020.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2020/072202, dated Apr. 24, 2020, 21 pages (with machine translation).

BLOCKCHAIN-BASED BILL NUMBER ALLOCATION METHOD, APPARATUS AND ELECTRONIC DEVICE

CROSS-REFERENCE TO RELATED APPLICATIONS

This application is a continuation of PCT Application No. PCT/CN2020/072202, filed on Jan. 15, 2020, which claims priority to Chinese Patent Application No. 201910703787.0, filed on Jul. 31, 2019, and each application is hereby incorporated by reference in its entirety.

TECHNICAL FIELD

One or more implementations of the present specification relate to the field of blockchain technologies, and in particular, to a blockchain-based bill number allocation method, apparatus and electronic device.

BACKGROUND

A blockchain technology, also referred to as a distributed ledger technology, is an emerging technology that several computing devices participate in "accounting" to jointly maintain a complete distributed database. The blockchain technology is characterized by decentralization, openness, and transparency, and also, in the blockchain technology, each computing device can participate in database recording, and data can be synchronized rapidly between the computing devices. Therefore, the blockchain technology has been widely applied to many fields.

SUMMARY

The present specification provides a blockchain-based bill number allocation method, where the method includes the following: receiving a target transaction sent by a billing initiator, where the target transaction includes bill information of an e-bill to be issued; in response to the target transaction, invoking check logic in a smart contract deployed in the blockchain network, and performing validity check on the bill information; and if the validity check succeeds, further invoking allocation logic in the smart contract, and allocating an e-bill number to the bill information from available e-bill number segments maintained in a blockchain account corresponding to a biller of the e-bill.

Optionally, the method further includes the following: publishing the bill information and the e-bill number allocated to the bill information in the blockchain network for storage, so that after detecting the bill information and the e-bill number, the billing initiator generates the e-bill from the bill information and the e-bill number based on an e-bill template of a billing regulator.

Optionally, a storage address of the e-bill template of the billing regulator is further stored in the blockchain network; and the publishing the bill information and the e-bill number allocated to the bill information in the blockchain network for storage, so that after detecting the bill information and the e-bill number, the billing initiator generates the e-bill from the bill information and the e-bill number based on an e-bill template of the billing regulator includes: publishing the bill information and the e-bill number allocated to the bill information in the blockchain network for storage, so that after detecting the bill information and the e-bill number, the billing initiator obtains the storage address of the e-bill template of the billing regulator from the blockchain network, obtains the e-bill template from a server of the billing regulator based on the storage address, and generates the e-bill from the bill information and the e-bill number.

Optionally, the method further includes the following: invoking billing logic in the smart contract deployed in the blockchain network, to generate the e-bill from the bill information and the e-bill number based on an e-bill template of a billing regulator stored in the blockchain network, and publishing the generated e-bill in the blockchain network for storage.

Optionally, the network node in the blockchain network is connected to a server of a billing regulator by using an oracle; and the method further includes the following: invoking billing logic in the smart contract deployed in the blockchain network, obtaining an e-bill template from the server of the billing regulator by using the oracle, generating the e-bill from the bill information and the e-bill number based on the e-bill template obtained, and publishing the generated e-bill in the blockchain network for storage.

Optionally, the bill information includes a bill type of the e-bill, and available number segments corresponding to bill types that can be issued by the biller of the e-bill are maintained in the blockchain account corresponding to the biller; and the allocating an e-bill number to the bill information from available e-bill number segments maintained in a blockchain account corresponding to a biller of the e-bill includes the following: determining an available number segment corresponding to a bill type of the e-bill to be issued from the available e-bill number segments maintained in the blockchain account corresponding to the biller of the e-bill; and allocating the e-bill number to the bill information from the determined available number segment.

Optionally, the validity check includes at least one of checking permission of the billing initiator and checking billing permission of the biller.

Optionally, the blockchain is a consortium blockchain, and consortium members in the consortium blockchain include a financial institution serving as a billing regulator and a billing institution serving as a biller.

The present specification further provides a blockchain-based bill number allocation apparatus, where the apparatus is applied to a network node in a blockchain network, and the apparatus includes the following: a receiving module, configured to receive a target transaction sent by a billing initiator, where the target transaction includes bill information of an e-bill to be issued; a check module, configured to: in response to the target transaction, invoke check logic in a smart contract deployed in the blockchain network, and perform validity check on the bill information; and an allocation module, configured to: if the validity check succeeds, further invoke allocation logic in the smart contract, and allocate an e-bill number to the bill information from available e-bill number segments maintained in a blockchain account corresponding to a biller of the e-bill.

Optionally, the apparatus further includes a publishing module, configured to publish the bill information and the e-bill number allocated to the bill information in the blockchain network for storage, so that after detecting the bill information and the e-bill number, the billing initiator generates the e-bill from the bill information and the e-bill number based on an e-bill template of a billing regulator.

Optionally, a storage address of the e-bill template of the billing regulator is further stored in the blockchain network; and the publishing module is configured to publish the bill information and the e-bill number allocated to the bill information in the blockchain network for storage, so that after detecting the bill information and the e-bill number, the billing initiator obtains the storage address of the e-bill template of the billing regulator from the blockchain network, obtains the e-bill template from a server of the billing regulator based on the storage address, and generates the e-bill from the bill information and the e-bill number.

Optionally, the apparatus further includes a first generation module, configured to invoke billing logic in the smart contract deployed in the blockchain network, to generate the e-bill from the bill information and the e-bill number based on an e-bill template of a billing regulator stored in the blockchain network, and publish the generated e-bill in the blockchain network for storage.

Optionally, the network node in the blockchain network is connected to a server of a billing regulator by using an oracle; and the apparatus further includes a second generation module, configured to invoke billing logic in the smart contract deployed in the blockchain network, obtain an e-bill template from the server of the billing regulator by using the oracle, generate the e-bill from the bill information and the e-bill number based on the e-bill template obtained, and publish the generated e-bill in the blockchain network for storage.

Optionally, the bill information includes a bill type of the e-bill, and available number segments corresponding to bill types that can be issued by the biller of the e-bill are maintained in the blockchain account corresponding to the biller; and the allocation unit is configured to determine an available number segment corresponding to a bill type of the e-bill to be issued from the available e-bill number segments maintained in the blockchain account corresponding to the biller of the e-bill; and allocate the e-bill number to the bill information from the determined available number segment.

Optionally, the validity check includes at least one of checking permission of the billing initiator and checking billing permission of the biller.

Optionally, the blockchain is a consortium blockchain, and consortium members in the consortium blockchain include a financial institution serving as a billing regulator and a billing institution serving as a biller.

The present specification further provides an electronic device, including the following: a processor; and a memory, configured to store an instruction that can be executed by the processor, where the processor runs the executable instruction to implement the blockchain-based bill number allocation method.

The present specification further provides a computer-readable storage medium, where the computer-readable storage medium stores a computer instruction, and when the instruction is executed by a processor, the blockchain-based bill number allocation method is implemented.

It can be seen from the previous description that the network node in the blockchain network can respond to the target transaction sent by the billing initiator, to determine that validity check succeeds on the bill information included in the target transaction, and then invoke the allocation logic in the smart contract deployed in the blockchain network, to allocate the e-bill number to the bill information from the available e-bill number segments maintained in the blockchain account corresponding to the biller of the e-bill. Subsequently, the network node in the blockchain network or the billing initiator can independently generate the e-bill based on the bill information, the e-bill number, and the e-bill template, so that a user can obtain the e-bill number of the e-bill to be issued by using the blockchain network, and the user can independently issue the e-bill.

DESCRIPTION OF IMPLEMENTATIONS

Figure 1:
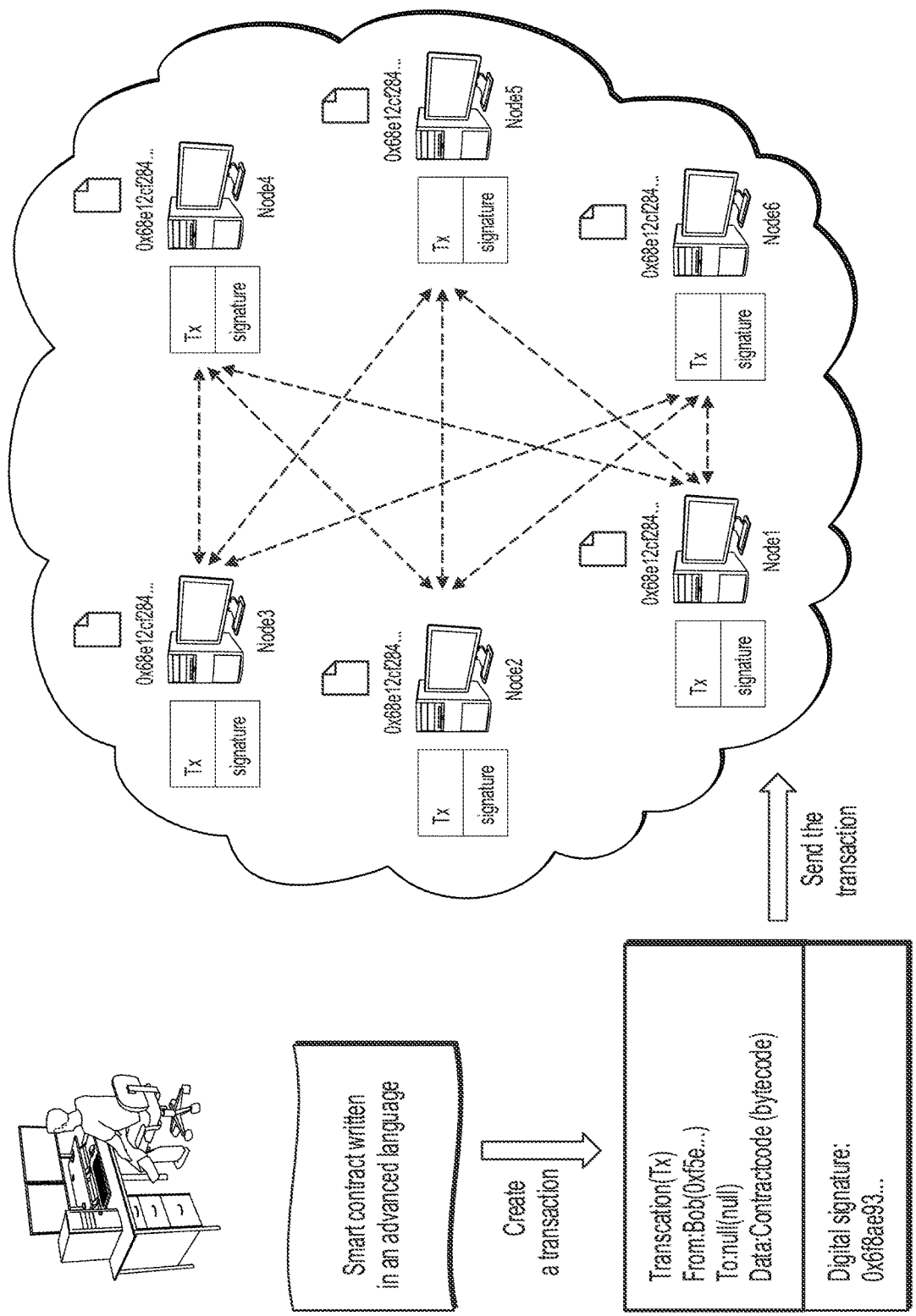
FIG. 1 is a schematic diagram illustrating creation of a smart contract, according to an example implementation of the present specification.

Example implementations are described in detail here, and examples of the example implementations are presented in the accompanying drawings. When the following description relates to the accompanying drawings, unless specified otherwise, same numbers in different accompanying drawings represent same or similar elements. Implementations described below do not represent all implementations consistent with one or more implementations of the present specification. On the contrary, the implementations are only examples of apparatuses and methods that are described in the appended claims in detail and consistent with some aspects of one or more implementations of the present specification.

It is worthwhile to note that in other implementations, steps of a corresponding method are not necessarily performed according to the sequence shown and described in the present specification. In some other implementations, the method may include more or less steps than those described in the present specification. In addition, a single step described in the present specification may be divided into a plurality of steps in other implementations for description. However, a plurality of steps described in the present specification may also be combined into a single step for description in other implementations.

Generally, there are three types of blockchains: a public blockchain, a private blockchain, and a consortium blockchain. In addition, there can be combinations of the previous multiple types, such as a combination of a private blockchain and a consortium blockchain, and a combination of a consortium blockchain and a public blockchain.

The public blockchain has the highest degree of decentralization. Bitcoin and Ethereum are representatives of the public blockchain. Participants of the public blockchain (which can also be referred to as nodes in the blockchain network) can read data records in the blockchain, participate in transactions, compete for accounting rights of new blocks, etc. In addition, each node can freely join or exit a network and perform a related operation.

On the contrary, write permission of the private blockchain network is controlled by a certain organization, and data read permission is specified by the organization.

Briefly, the private blockchain network can be a weakly centralized system, a strict restriction is imposed on participating nodes, and there are a few participating nodes. This type of blockchain is more suitable for use within a specified organization.

The consortium blockchain is a blockchain between the public blockchain and the private blockchain, and can implement "partial decentralization". Each node in the consortium blockchain network usually has a corresponding organization. Participants join the network through authorization and form an interest-related consortium to jointly maintain running of the blockchain network.

Based on basic features of the blockchain, the blockchain usually consists of several blocks. Timestamps corresponding to creation moments of the blocks are separately recorded in the blocks, and all the blocks form a time-ordered data chain strictly based on the timestamps recorded in the blocks.

Real data generated in the physical world can be formed into a standard transaction format supported by the blockchain, and then published in the blockchain network. Network nodes in the blockchain network perform consensus processing on the received transaction. After a consensus is reached, a network node serving as an accounting node in the blockchain network packs the transaction into a block and persistently stores the transaction in the blockchain network.

Consensus algorithms supported by the blockchain can include a first-type consensus algorithm and a second-type consensus algorithm.

The first-type consensus algorithm is a consensus algorithm that network nodes need to compete for accounting rights in each round of accounting, for example, proof of work (POW), proof of stake (POS), or delegated proof of stake (DPOS).

The second-type consensus algorithm is a consensus algorithm that an accounting node for each round of accounting is elected in advance (no need to compete for accounting rights), for example, practical Byzantine fault tolerance (PBFT).

In a blockchain network using the first-type consensus algorithm, all network nodes that compete for the accounting rights can execute a transaction after receiving the transaction. One of the network nodes that compete for the accounting rights may win in the current round of competing for the accounting rights, and becomes the accounting node. The accounting node can pack the received transaction and other transactions together to generate the latest block, and send the latest block generated or a block header of the latest block to other network nodes for consensus.

In a blockchain network using the second-type consensus algorithm, a network node with the accounting rights has been predetermined before the current round of accounting. Therefore, after receiving the transaction, a network node can send the transaction to the accounting node if the network node is not the accounting node of the current round. The accounting node of the current round can execute the transaction when or before the transaction is packed with other transactions to generate the latest block. After generating the latest block, the accounting node can send the latest block or the block header of the latest block to other network nodes for consensus.

As described above, regardless of which consensus algorithm is used in the blockchain network, the accounting node of the current round can pack the received transaction to generate the latest block, and send the latest block generated or the block header of the latest block to other network nodes for consensus verification. If the other network nodes verify that there is no problem after receiving the latest block or the block header of the latest block, the other network nodes can append the latest block to the end of a current blockchain, to complete the accounting process in the blockchain network. When performing verification on a new block or a block header sent by the accounting node, another node can also execute a transaction included in the block.

In the blockchain field, an important concept is account. For example, for Ethereum, accounts are usually classified into an external account and a contract account. The external account is an account directly controlled by a user and is also referred to as a user account. The contract account is created by a user by using an external account and is an account including contract code (i.e., a smart contract). Certainly, for some blockchain projects (e.g., an ant blockchain) derived from the Ethereum architecture, account types supported by the blockchains can be further extended. Implementations are not specially limited in the present specification.

For an account in the blockchain, an account state of the account is usually maintained by using a structure. When a transaction in a block is executed, a state of an account associated with the transaction in the blockchain usually also changes.

For example, for Ethereum, a structure of an account usually includes fields such as BALANCE, NONCE, CODE, and STORAGE.

The BALANCE field is used to maintain a current account balance of the account.

The NONCE field is used to maintain the number of transactions of the account, and the field is a counter used to ensure that each transaction can be processed only once, to effectively reduce replay attacks.

The CODE field is used to maintain contract code of the account. In practice, the CODE field generally maintains only a hash value of the contract code. Therefore, the CODE field is usually also referred to as a Codehash field.

The STORAGE field is used to maintain storage content of the account (the field value is null by default). For a contract account, independent storage space is usually allocated to store storage content of the contract account. The independent storage space is usually referred to as account storage of the contract account. The storage content of the contract account is usually stored in the independent storage space by being constructed as a data structure of a Merkle Patricia Trie (MPT) tree. The MPT tree constructed based on the storage content of the contract account is usually also referred to as a storage tree. The STORAGE field usually maintains only a root node of the storage tree. Therefore, the STORAGE field is usually also referred to as a StorageRoot field.

For an external account, field values of the CODE field and the STORAGE field shown above are both null.

In addition, in practice, a smart contract can be provided in the public blockchain, the private blockchain, and the consortium blockchain. A smart contract in a blockchain is a contract that can be triggered by a transaction in the blockchain. The smart contract can be defined in a form of code.

Taking Ethereum as an example, users can create and invoke complex logic in an Ethereum network. As a programmable blockchain, the core of Ethernet is an Ethernet virtual machine (EVM), and each Ethernet node can run the EVM. The EVM is a Turing-complete virtual machine, through which various types of complex logic can be implemented. A smart contract published and invoked by a user in Ethereum can be run by the EVM. Actually, virtual machine code (virtual machine byte code, referred to as "byte code" below) is directly run on the EVM, and therefore, a smart contract deployed in a blockchain network can be byte code.

As shown in FIG. 1, after Bob sends a transaction including information about creating a smart contract to the Ethereum network, each node can execute the transaction in the EVM. In FIG. 1, a FROM field of the transaction is used to record an address of an account that initiates creation of the smart contract, contract code stored in a field value of a DATA field of the transaction can be byte code, and a field value of a TO field of the transaction is a null account. After nodes reach a consensus by using a consensus mechanism, the smart contract is successfully created, and then a user can invoke the smart contract.

After the smart contract is created, a contract account corresponding to the smart contract appears in the blockchain network and has a specified address. For example, "0x68e12cf284 . . . " in each node in FIG. 1 represents the address of the contract account created, and contract code and account storage will be stored in account storage of the contract account. Behavior of the smart contract is controlled by the contract code, and a contract state is stored in the account storage of the smart contract. In other words, a virtual account including contract code and account storage is generated in the blockchain network by using the smart contract.

As mentioned above, a DATA field of a transaction including creating a smart contract can store byte code of the smart contract. The byte code includes a series of bytes. Each byte can identify one operation. Considering development efficiency, readability, etc., developers may not write byte code directly, but choose an advanced language to write smart contract code. For example, advanced languages can be Solidity, Serpent, and LLL. Smart contract code written in an advanced language can be compiled by using a compiler, to generate byte code that can be deployed in a blockchain network.

Taking the Solidity language as an example, contract code written in the Solidity language is similar to class in an object-oriented programming language. A plurality of members can be stated in a contract, including a state variable, a function, a function modifier, an event, etc. The state variable is a value that is permanently stored in an ACCOUNT STORAGE field of a smart contract and is used to store a contract state.

Figure 2:
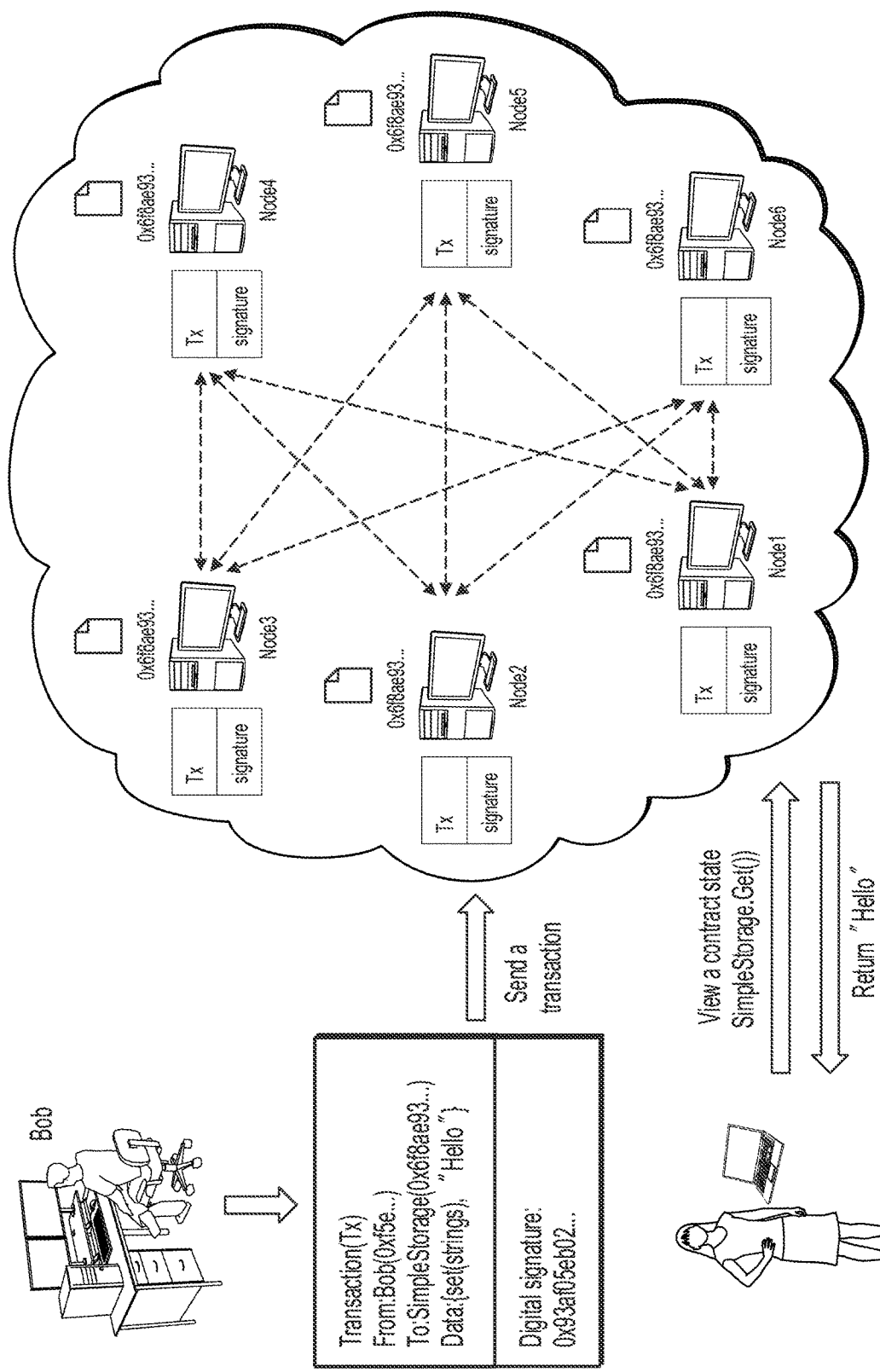
FIG. 2 is a schematic diagram illustrating invocation of a smart contract, according to an example implementation of the present specification.

As shown in FIG. 2, still using Ethereum as an example, after Bob sends a transaction including information about invoking a smart contract to an Ethereum network, each node can execute the transaction in the EVM. In FIG. 2, a FROM field of the transaction is used to record an address of an account that initiates invocation of the smart contract, a TO field is used to record an address of the invoked smart contract, and a DATA field of the transaction is used to record a method and a parameter for invoking the smart contract. After the smart contract is invoked, an account state of the contract account can change. Subsequently, a client can view the account state of the contract account by using an accessed blockchain node (e.g., node 1 in FIG. 2).

A smart contract can be executed independently on each node in a blockchain network in a specified way, and all execution records and data are stored in the blockchain network. Therefore, after such a transaction is executed, transaction vouchers that cannot be tampered with and will not be lost are stored in the blockchain network.

Figure 3:
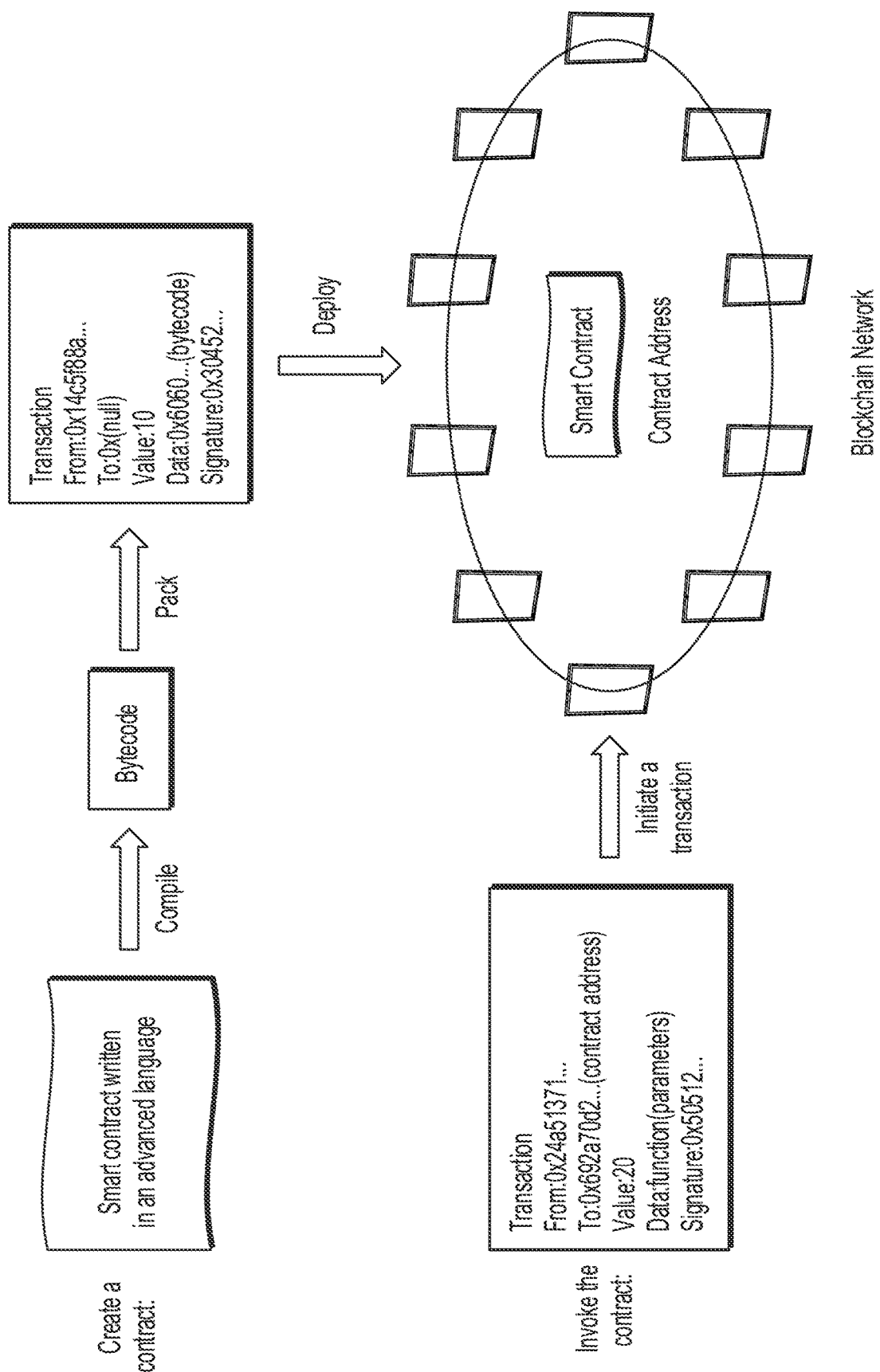
FIG. 3 is a schematic diagram illustrating creation and invocation of a smart contract, according to an example implementation of the present specification.

FIG. 3 is a schematic diagram illustrating creation and invocation of a smart contract. To create a smart contract in Ethereum, processes such as writing a smart contract, generating byte code, and deploying the byte code in a blockchain network are needed. Invoking a smart contract in Ethereum is initiating a transaction relating to an address of the smart contract. The transaction can be executed in an EVM of each node, and smart contract code is distributed and run on a virtual machine of each node in the Ethereum network.

For a conventional blockchain project represented by Ethereum, to implement "value transfer" in a blockchain, conversion of a currency in the real world into a virtual coin that can be circulated in the blockchain is usually supported.

In the blockchain field, some blockchain projects (e.g., an ant blockchain) derived from the Ethereum architecture usually no longer support a function of converting a currency in the real world into a virtual coin that can be circulated in the blockchain. Instead, in these blockchain projects, some physical assets without a currency attribute in the real world can be converted into virtual assets that can be circulated in the blockchain.

It is worthwhile to note that conversion of physical assets without a currency attribute in the real world into virtual assets in the blockchain is usually a process of "anchoring" the physical assets with virtual assets in the blockchain as a value support of the virtual assets, and then generating, in the blockchain, virtual assets that match the value of the physical assets and that can be circulated between blockchain accounts in the blockchain.

During implementation, account types supported by the blockchain can be extended, and an asset account (also referred to as an asset object) can be further obtained by extending the account types supported by the blockchain. For example, an asset account can be obtained by extending an external account and a contract account supported by Ethereum. The asset account obtained corresponds to a virtual asset that can use a physical asset without a currency attribute in the real world as a value support and that can be circulated between blockchain accounts.

For a user accessing such a blockchain, in addition to creating a user account and a smart contract in the blockchain, the user can create a virtual asset that matches the value of a physical asset without a currency attribute in the real world in the blockchain, to be circulated in the blockchain.

For example, the user can convert physical assets held without a currency attribute, such as real estate, stock, loan contract, bill, and accounts receivable, into value-matched virtual assets to be circulated in the blockchain.

For the asset account, an account state of the account can also be maintained by using a structure. Content included in the structure of the asset account can be the same as the content included in the structure of the account in Ethereum, or certainly can be designed based on an actual demand.

In an implementation, for example, the content included in the structure of the asset account is the same as the content included in the structure of the account in Ethereum. In this case, the structure of the asset account can also include the previously described fields such as BALANCE, NONCE, CODE, and STORAGE.

It is worthwhile to note that, in Ethereum, the BALANCE field is usually used to maintain a current account balance of an account. However, for a blockchain project derived from the Ethereum architecture, because the blockchain project may not support conversion of a currency in the real world into a virtual coin that can be circulated in the blockchain, in such a blockchain, the meaning of the BALANCE field can be extended, so that the BALANCE field no longer represents the "balance" of the account, but is used to maintain address information of an asset account corresponding to a "virtual asset" held by the account. In practice, the BALANCE field can maintain address information of asset accounts corresponding to multiple "virtual assets".

In this case, the external account, the contract account, and the asset account shown above all can hold a virtual asset that needs to be held by adding address information of an asset account corresponding to the "virtual asset" to the BALANCE field. In other words, in addition to the external account and the contract account, the asset account itself can also hold a virtual asset.

For the asset account, field values of the NONCE field and the CODE field can be null (or may not be null), a field value of the STORAGE field may not be null anymore, and the STORAGE field can be used to maintain an asset state of a "virtual asset" corresponding to the asset account. A specific method for maintaining the asset state of the "virtual asset" corresponding to the asset account in the STORAGE field can be flexibly designed based on a demand, and details are omitted for simplicity.

In a blockchain project derived from the Ethereum architecture, a user can use the following implementations to create a virtual asset that matches the value of a physical asset without a currency attribute in the real world value in the blockchain.

In an implementation, a transaction type supported by the blockchain can be extended to obtain a transaction for creating a virtual asset. For example, transaction types supported by Ethereum usually include a common transfer transaction, a transaction for creating a smart contract, and a transaction for invoking a smart contract. In this case, the three types of transactions can be extended to obtain a transaction for creating a virtual asset.

In this case, the user can publish a transaction for creating a virtual asset in the blockchain network by using a client, and a network node in the blockchain network executes the transaction on a local EVM to create a virtual asset for the user. After an agreement is reached among network nodes through a consensus mechanism, the virtual asset is successfully created, and an asset account corresponding to the virtual asset appears in the blockchain and has a specified address.

In another implementation, a smart contract for creating a virtual asset can be deployed in the blockchain network, and details of a process of deploying the smart contract for creating a virtual asset are omitted for simplicity.

In this case, the user can publish a transaction for invoking the smart contract in the blockchain network by using a client, and a network node in the blockchain network executes the transaction on a local EVM, and runs contract code related to the smart contract on the EVM, to create a virtual asset for the user. After an agreement is reached among network nodes through a consensus mechanism, the virtual asset is successfully created, and an asset account corresponding to the virtual asset appears in the blockchain and has a specified address.

Certainly, for some blockchain projects derived from the Ethereum architecture, if the blockchain projects also support the function of converting a currency in the real world into a virtual coin that can be circulated in the blockchain, some physical assets without a currency attribute in the real world can still be converted into a form of virtual coins that can be circulated in the blockchain, to be circulated in the blockchain. Details are omitted in the present specification for simplicity.

In a cross-chain scenario, multiple blockchains can implement cross-chain connection through cross-chain relays.

The cross-chain relays can be separately connected to the multiple blockchains through bridge interfaces, and complete cross-chain data synchronization among the multiple blockchains based on data transport logic implementation.

A cross-chain technology used to implement the cross-chain relays is not specially limited in the present specification. For example, in practice, multiple blockchains can be connected through a cross-chain mechanism such as a side chain technology or a notary technology.

After the multiple blockchains are connected through the cross-chain relays, data in other blockchains can be read and authenticated among the blockchains, and smart contracts deployed in other blockchains can be invoked through the cross-chain relays.

In addition to using data stored in a blockchain network, a smart contract deployed in the blockchain network can reference data on a data entity outside the blockchain network by using an oracle, to implement data exchange between the smart contract and the data entity in the real world. The data entity outside the blockchain network can include a centralized server, data center, etc. deployed outside the blockchain network.

Different from the cross-chain relay, the oracle is not used to synchronize data in a blockchain network to another blockchain network, but is used to synchronize data on a data entity outside a blockchain network to the blockchain network.

In other words, the cross-chain relay is used to connect two blockchain networks, and the oracle is used to connect a blockchain network and a data entity outside the blockchain network, to implement data exchange between the blockchain network and the real world.

As business scenarios of a blockchain become diversified, in addition to services related to value transfer such as money transfer, more blockchain projects begin to introduce conventional service scenarios not related to value transfer. For example, a service system can be connected to a service blockchain to implement conventional service scenarios such as issuance and reimbursement of e-bills in the service blockchain.

To issue e-bills conventionally, a user needs to apply for billing to a biller. The biller can issue paper invoices to the user based on register paper uniformly distributed by a billing regulator. Or, the biller can issue electronic invoices for the user.

The purpose of the present specification is to provide a new blockchain-based billing method for allocating an e-bill number to bill information of an e-bill to be issued and generating the e-bill based on the e-bill information allocated, so that a user can independently issue a bill based on a blockchain.

During implementation, a blockchain account of each biller is maintained in a blockchain network, and a number segment of an e-bill that can be issued by each biller is stored in the account.

When receiving a target transaction that is sent by a billing initiator and includes bill information of an e-bill to be issued, a network node in the blockchain network invokes check logic in a smart contract deployed in the blockchain network, to perform validity check on the bill information.

After the validity check succeeds, the network node in the blockchain network further invokes allocation logic in the smart contract, to allocate an e-bill number to the bill information from available e-bill number segments maintained in a blockchain account corresponding to a biller of the e-bill.

The network node in the blockchain network or the billing initiator can generate the e-bill based on the bill information, the e-bill number, and an e-bill template of a billing regulator.

In the previous technical solutions, the network node in the blockchain network can respond to the target transaction sent by the billing initiator, to determine that validity check succeeds on the bill information included in the target transaction, and then invoke the allocation logic in the smart contract deployed in the blockchain network, to allocate the e-bill number to the bill information from the available e-bill number segments maintained in the blockchain account corresponding to the biller of the e-bill. Subsequently, the network node in the blockchain network or the billing initiator can independently generate the e-bill based on the bill information, the e-bill number, and the e-bill template, so that a user can obtain the e-bill number of the e-bill to be issued by using the blockchain network, and the user can independently issue the e-bill.

Figure 4:
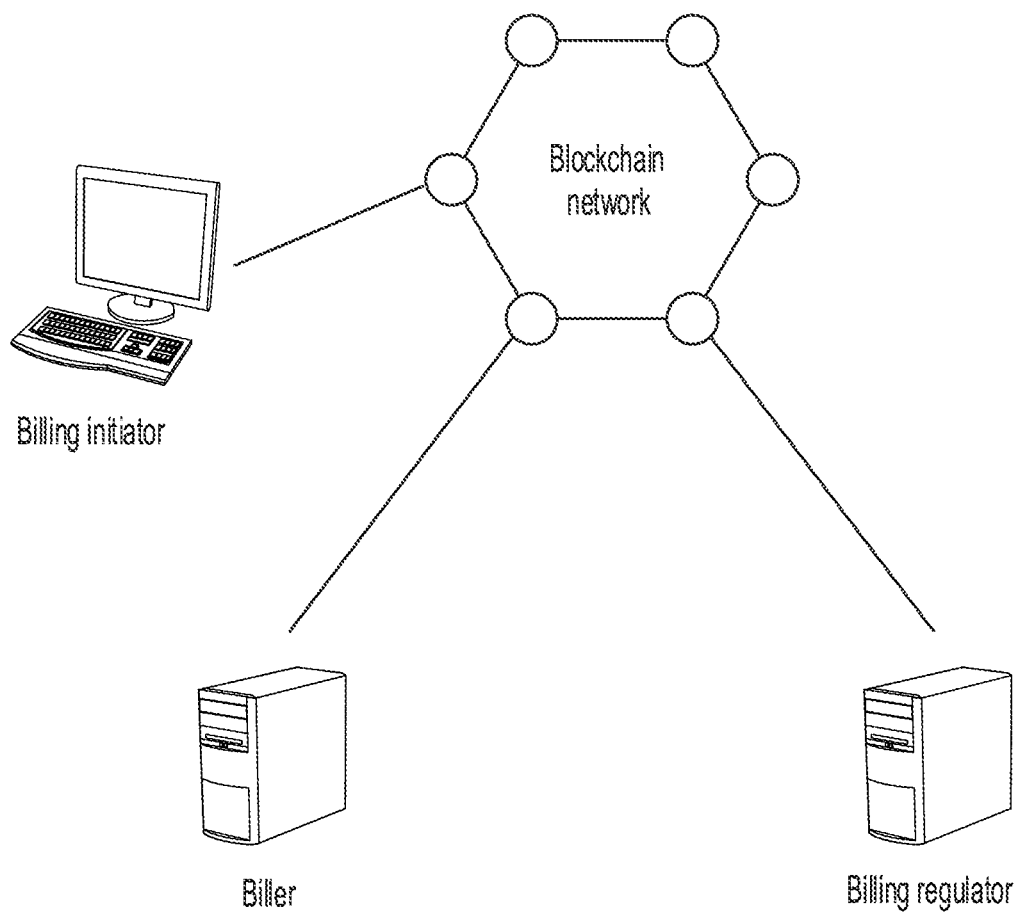
FIG. 4 is a schematic diagram illustrating a blockchain-based bill number allocation system, according to an example implementation of the present specification.

FIG. 4 is an architectural diagram illustrating blockchain-based bill number allocation networking, according to an example implementation of the present specification.

As shown in FIG. 4, the networking includes a billing initiator, a biller, a billing regulator, and a blockchain network.

The billing initiator is a party for which an e-bill needs to be issued. For example, the billing initiator can be a user, or can be a unit for which an e-bill needs to be issued. The user and the unit are only examples of the billing initiator. Implementations are not limited.

The biller is a billing organization that can issue e-bills.

Certainly, the biller can also serve as a billing initiator to initiate a billing operation to other billing initiators.

For example, if a user purchases a mobile phone on electronic platform 1 (i.e., a unit) and needs to have an invoice issued by electronic platform 1. In this scenario, the user is a billing initiator, and electronic platform 1 is a biller.

For another example, a unit of electronic platform 1 purchases a batch of computers from electronic platform 2 and needs to have an invoice issued from electronic platform 2. In this scenario, the unit of electronic platform 1 is a billing initiator, and electronic platform 2 is a biller.

The billing regulator is a party with a billing regulation capability. For example, the billing regulator can be a financial institution. For example, the billing regulator can be a municipal finance department or a provincial finance department.

The billing regulator usually issues e-bill templates corresponding to different e-bill types. For example, a value-added tax (VAT) invoice corresponds to a VAT invoice bill template (similar to conventional register paper of the VAT invoice), and a plain invoice corresponds to a plain invoice bill template (similar to register paper of the plain invoice).

The billing regulator can publish e-bill templates corresponding to different bill types in the blockchain network for storage. Certainly, the billing regulator can further store the e-bill template on an offchain server (e.g., a server of the billing regulator), and publish a storage address in the blockchain network for storage. Or, the billing regulator can publish the e-bill template in another blockchain network for storage. Only examples of the e-bill template stored by the billing regulator are described here. Implementations are not limited.

Figure 5:
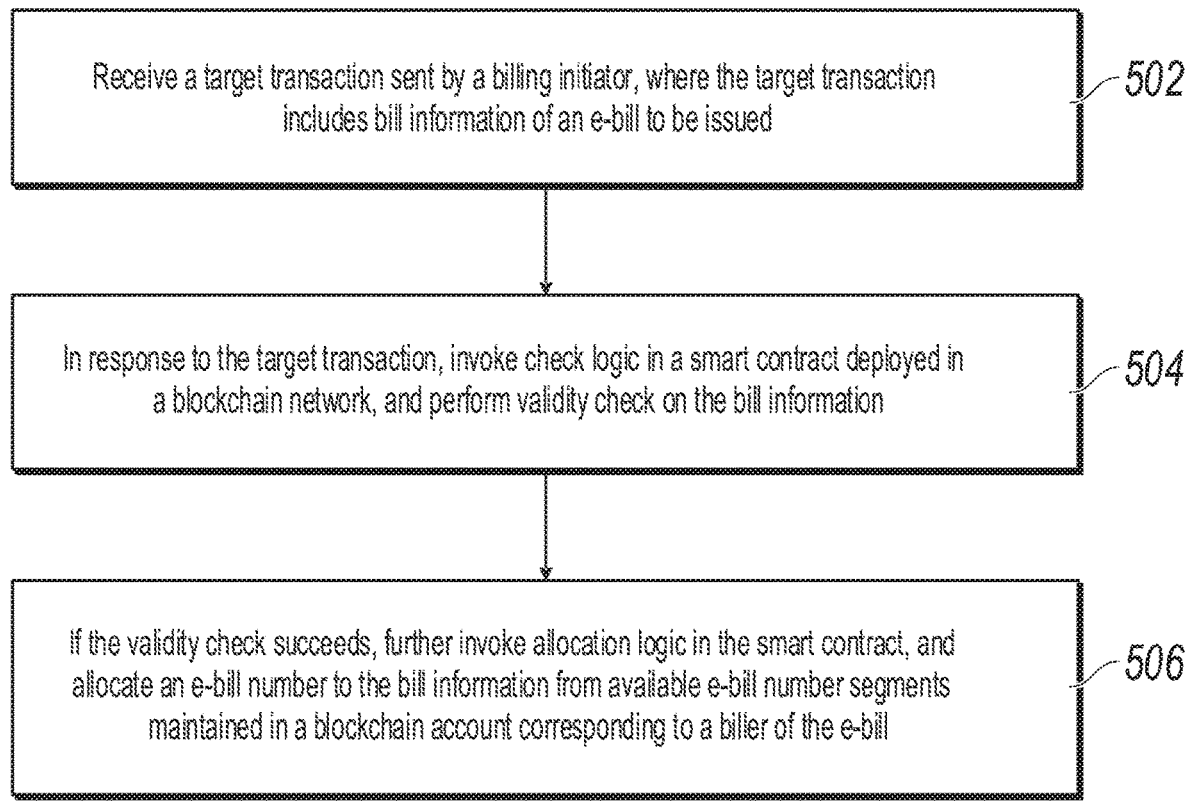
FIG. 5 is a flowchart illustrating a blockchain-based bill number allocation method, according to an example implementation of the present specification.

FIG. 5 is a flowchart illustrating a blockchain-based bill number allocation method, according to an example implementation of the present specification. The method can be applied to a network node in a blockchain network, and can include the following steps.

Step 502: Receive a target transaction sent by a billing initiator, where the target transaction includes bill information of an e-bill to be issued.

Step 504: In response to the target transaction, invoke check logic in a smart contract deployed in the blockchain network, and perform validity check on the bill information.

The bill information of the e-bill to be issued can include information that needs to be filled in a conventional paper invoice. For example, the bill information can include an e-bill type, payer information, payee information, merchandise or service details, an amount, a tax rate, a tax amount, and an invoice date.

The payer information can include a payer name, a tax identification number, an address, and a telephone number of a taxpayer, an opening bank, an account number, etc.

The payee information can include a payee name, a tax identification number, an address, and a telephone number of a taxpayer, an opening bank, an account number, etc.

Certainly, only examples of the bill information, the payer information, and the payee information are described here. Implementations are not limited.

In addition, in the implementation provided in the present specification, the smart contract used to allocate a bill number to the bill information of the e-bill to be issued is further deployed in the blockchain network.

The smart contract deployed can include check logic and allocation logic. This check logic can be used to check whether the bill information is valid. The logic for checking whether the bill information is valid can be written into the smart contract by the developer of the smart contract in the form of code.

After it is determined that the bill information is valid, the allocation logic is used to allocate the e-bill number to the bill information from available e-bill number segments maintained in a blockchain account corresponding to a biller of the e-bill.

The billing initiator (a common user or unit) can construct the target transaction by using a client after the smart contract is deployed. The target transaction includes the bill information of the e-bill to be issued. Then, the billing initiator can publish the target transaction in the blockchain network.

After receiving the target transaction, the network node in the blockchain network can invoke, in response to the target transaction, the check logic stated in the smart contract deployed in the blockchain network to check validity of the bill information.

The validity check can include at least one of checking permission of the billing initiator and checking billing permission of the biller.

Checking permission of the billing initiator can be checking whether the billing initiator has permission to initiate billing for the billing information, for example, checking whether the billing initiator is a payer in the bill information.

For example, the target transaction can further include a user identifier (e.g., a tax identification number of a taxpayer) of the billing initiator. When invoking the check logic in the smart contract to check the bill information, the network node in the blockchain network can first obtain a user identifier of a payer recorded in the bill information, and then detect whether the user identifier of the billing initiator is consistent with the user identifier of the payer.

If the user identifier of the billing initiator is consistent with the user identifier of the payer, the network node in the blockchain network can determine that the permission check of the billing initiator succeeds.

If the user identifier of the billing initiator is inconsistent with the user identifier of the payer, the network node in the blockchain network can determine that the permission check of the billing initiator fails.

Checking billing permission of the biller can be checking whether the biller has permission to issue a certain type of e-bill. For example, if a bill type included in the bill information is VAT invoice, whether the biller has permission to issue a VAT invoice can be detected.

For example, the bill information includes a user identifier of a payee (i.e., a biller) and the bill type. The network node in the blockchain network can invoke the check logic in the smart contract to detect whether the payee has permission to issue e-bills of the type.

If the payee has permission to issue e-bills of the type, the check on the billing permission of the biller succeeds.

If the payee has no permission to issue e-bills of the type, the check on the billing permission of the biller fails.

Certainly, in practice, the validity check can further include other check related to the practice. The validity check is merely described here as an example, and the validity check is not limited.

Step 506: If the validity check succeeds, further invoke allocation logic in the smart contract, and allocate an e-bill number to the bill information from available e-bill number segments maintained in a blockchain account corresponding to a biller of the e-bill.

In the implementation of the present specification, a blockchain account of each biller is maintained in the blockchain network, and the biller account can be the previously described asset account.

For the blockchain account of the biller, an account state of the account can also be maintained by using a structure. Content included in the structure of the blockchain account of the biller can be the same as the content included in the structure of the account in Ethereum, or certainly can be designed based on an actual demand.

In an implementation, for example, the content included in the structure of the biller account is the same as the content included in the structure of the account in Ethereum. In this case, the structure of the biller account can also include the previously described fields such as BALANCE, NONCE, CODE, and STORAGE.

In the implementation of the present specification, the BALANCE field can no longer represent the "balance", but is used to represent an available e-bill number segment, and the STORAGE field can be used to represent an e-bill number segment used. Certainly, the STORAGE field can further include other information, and only examples are described here. Implementations are not limited.

When determining that the validity check on the bill information succeeds, the network node in the blockchain network further invokes the allocation logic in the smart contract, to allocate the e-bill number to the bill information from the available e-bill number segments maintained in the blockchain account corresponding to the biller of the e-bill.

Available number segments corresponding to e-bill types that can be issued by the biller are maintained in the blockchain account corresponding to the biller.

For example, an available number segment corresponding to VAT invoices and an available number segment corresponding to plain invoices are maintained in the blockchain account corresponding to the biller.

When allocating the e-bill number to the bill information from the available e-bill number segments maintained in the blockchain account corresponding to the biller of the e-bill, the network node in the blockchain network can determine an available number segment corresponding to the e-bill type to be issued from the blockchain account corresponding to the biller. Then, the network node allocates the e-bill number to the bill information of the e-bill to be issued from the determined available number segment.

For example, the bill information of the e-bill to be issued includes a bill type. Assume that the bill type is VAT invoice.

The available number segments maintained in the blockchain account corresponding to the biller are shown in Table 1.

TABLE 1

| Bill type | Available number segment |
| --- | --- |
| VAT invoice | Available number segment 1 |
| Plain invoice | Available number segment 2 |

When determining that the validity check on the bill information succeeds, the network node in the blockchain network further invokes the allocation logic in the smart contract, to determine available number segment 1 of the bill type (i.e., VAT invoice) of the e-bill to be issued from the available number segments maintained in the blockchain account corresponding to the biller. Then, the network node in the blockchain network can allocate the e-bill number to the bill information from available number segment 1.

After allocating the e-bill number, the network node in the blockchain network can update the available number segments and used number segments that are maintained in the blockchain account of the biller.

For example, an available number segment of a VAT invoice maintained in the blockchain account of the biller is 1 to 100, and a used number segment is 101 to 200. Assume that 100 is allocated to the bill information. After the allocation is completed, the available number segment of the VAT invoice maintained in the blockchain account can be updated to 1 to 99, and the used number segment can be updated to 100 to 200. An available number segment and a used number segment of the plain invoice are unchanged.

In addition, the present specification further provides an e-bill generation method, to generate an e-bill based on bill information, an e-bill number, and an e-bill template.

Method 1: Allocate an e-bill number to bill information on a chain, and generate an e-bill off the chain.

In an optional implementation, after allocating the e-bill number to the bill information, a network node in a blockchain network can publish the bill information and the e-bill number allocated to the bill information in the blockchain network for storage.

A billing initiator can monitor the blockchain network, and the billing initiator can obtain an e-bill template of a billing regulator after detecting the bill information and the e-bill number stored in the blockchain network. Then, the billing initiator can generate the e-bill from the bill information and an e-bill number based on the e-bill template, and publish the generated e-bill in the blockchain network for storage.

How to obtain the e-bill template is described below.

During implementation, the billing regulator stores the e-bill template on a server of the billing regulator. Then, the billing regulator can publish a storage address of the e-bill template in the blockchain network for storage. Therefore, the storage address of the e-bill template is stored in the blockchain network.

The billing initiator can obtain the storage address of the e-bill template of the billing regulator from the blockchain network after detecting the bill information and the e-bill number stored in the blockchain network. Then, the billing initiator can obtain the e-bill template from the server of the billing regulator based on the storage address.

Method 2: Allocate an e-bill number to bill information on a chain, and generate an e-bill on the chain.

In the method, a smart contract deployed in a blockchain network further includes billing logic. The billing logic is used to obtain an e-bill template and generate the e-bill from the bill information and the e-bill number based on the e-bill template.

Certainly, a network node in the blockchain network generates the e-bill in different ways because storage ways of the e-bill template are different.

(1) The e-bill template is stored on a server of a billing regulator. The network node in the blockchain network obtains the e-bill template on the server of the billing regulator by using an oracle, and generates the e-bill from the bill information and the e-bill number based on the e-bill template.

During implementation, the network node in the blockchain network can be connected to the server of the billing regulator by using the oracle.

After allocating the e-bill number to the bill information, the network node in the blockchain network can invoke the billing logic in the smart contract, obtain the e-bill template from the server of the billing regulator by using the oracle, generate the e-bill from the bill information and the e-bill number based on the e-bill template obtained, and publish the generated e-bill in the blockchain network for storage.

For descriptions of the oracle, references can be made to the previous descriptions. Details are omitted here for simplicity.

(2) The e-bill template can be stored in the blockchain network. The network node in the blockchain network can generate the e-bill from the bill information and the e-bill number based on the e-bill template stored in the blockchain network.

During implementation, a billing regulator can publish the e-bill template in the blockchain network for storage.

After allocating the e-bill number to the bill information, the network node in the blockchain network can invoke the billing logic in the smart contract, generate the e-bill from the bill information and the e-bill number based on the e-bill template of the billing regulator stored in the blockchain network, and publish the generated e-bill in the blockchain network for storage.

(3) The e-bill template can be stored in another blockchain network. The network node in the current blockchain network can obtain the e-bill template from the another blockchain network through a cross-chain relay, and generate the e-bill from the bill information and the e-bill number based on the e-bill template.

During implementation, a billing regulator can maintain a financial blockchain network alone. The billing regulator can publish the e-bill template in the financial blockchain network for storage.

The current blockchain network can be connected to the financial blockchain network through a cross-chain relay.

After allocating the e-bill number to the bill information, the network node in the blockchain network can invoke the billing logic in the smart contract, and obtain the e-bill template from the financial blockchain network through a cross-chain relay. The network node in the blockchain network can generate the e-bill from the bill information and the e-bill number based on the e-bill template obtained, and publish the generated e-bill in the blockchain network for storage.

It can be seen from the previous description that the network node in the blockchain network can respond to the target transaction sent by the billing initiator, to determine that validity check succeeds on the bill information included in the target transaction, and then invoke the allocation logic in the smart contract deployed in the blockchain network, to allocate the e-bill number to the bill information from the available e-bill number segments maintained in the blockchain account corresponding to the biller of the e-bill. Subsequently, the network node in the blockchain network or the billing initiator can independently generate the e-bill based on the bill information, the e-bill number, and the e-bill template, so that a user can obtain the e-bill number of the e-bill to be issued by using the blockchain network, and the user can independently issue the e-bill.

The present application further provides an apparatus implementation corresponding to the previous method implementation.

Figure 6:
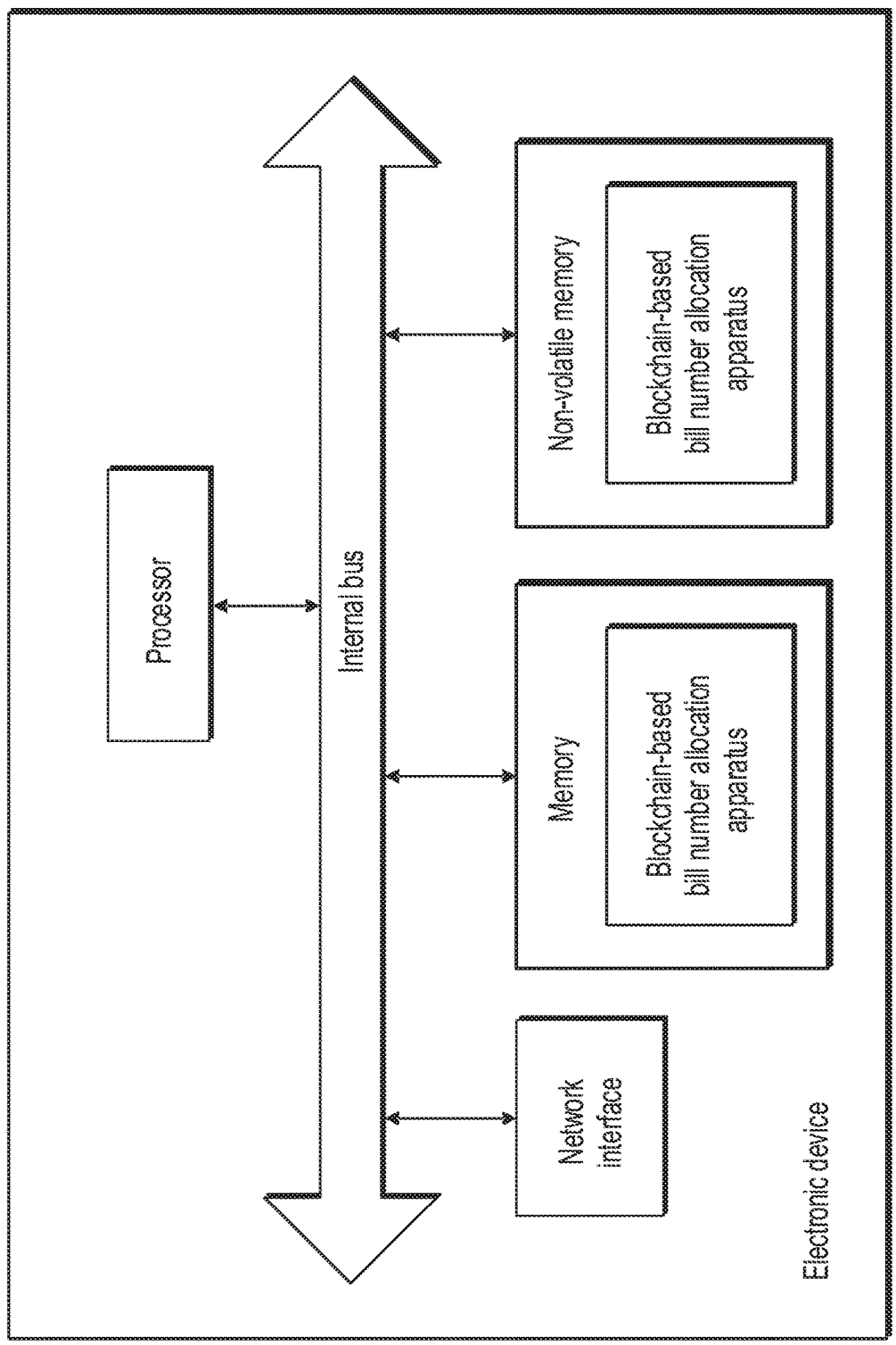
FIG. 6 is a diagram illustrating a hardware structure of an electronic device, according to an example implementation of the present specification.

Corresponding to the previous method implementation, the present specification further provides an implementation of a blockchain-based bill number allocation apparatus. The implementation of the blockchain-based bill number allocation apparatus in the present specification can be applied to an electronic device. The apparatus implementation can be implemented by software, hardware, or a combination of hardware and software. Software implementation is used as an example. As a logical apparatus, the apparatus is formed by reading a corresponding computer program instruction in a non-volatile memory to a memory by a processor of an electronic device where the apparatus is located. In terms of hardware, FIG. 6 is a diagram illustrating a hardware structure of an electronic device where the blockchain-based bill number allocation apparatus is located in the present specification. In addition to a processor, a memory, a network interface, and a non-volatile memory shown in FIG. 6, the electronic device where the apparatus is located in the implementation can usually include other hardware based on an actual function of the electronic device. Details are omitted for simplicity.

Figure 7:
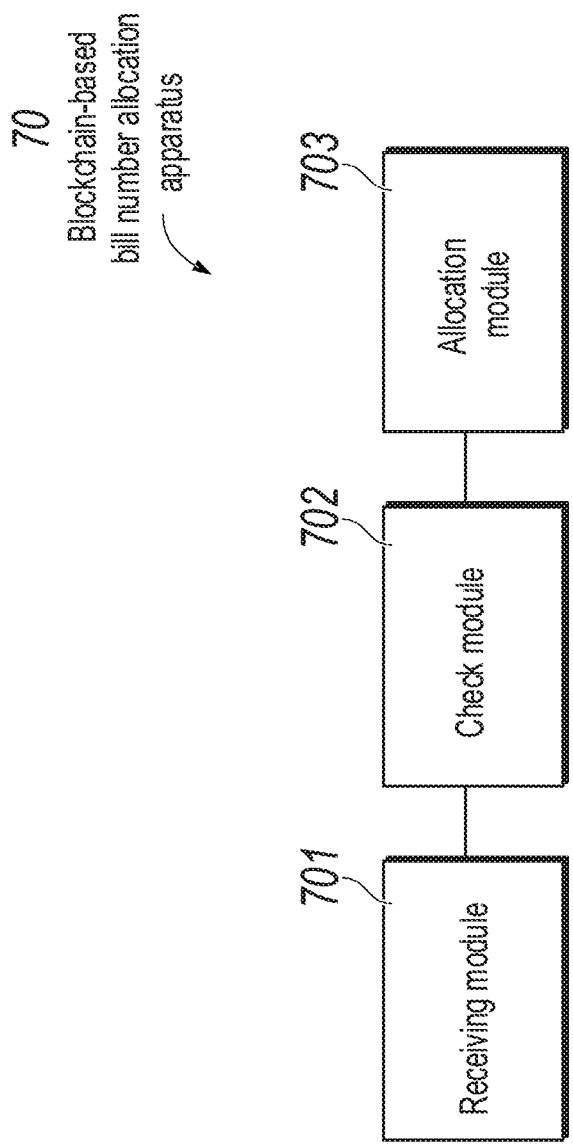
FIG. 7 is a block diagram illustrating a blockchain-based bill number allocation apparatus, according to an example implementation of the present specification.

FIG. 7 is a block diagram illustrating a blockchain-based bill number allocation apparatus, according to an example implementation of the present specification.

The apparatus is applied to a network node in a blockchain network, and the apparatus includes the following: a receiving module 701, configured to receive a target transaction sent by a billing initiator, where the target transaction includes bill information of an e-bill to be issued; a check module 702, configured to: in response to the target transaction, invoke check logic in a smart contract deployed in the blockchain network, and perform validity check on the bill information; and an allocation module 703, configured to: if the validity check succeeds, further invoke allocation logic in the smart contract, and allocate an e-bill number to the bill information from available e-bill number segments maintained in a blockchain account corresponding to a biller of the e-bill.

Optionally, the apparatus further includes a publishing module 704 (not shown in FIG. 7), configured to publish the bill information and the e-bill number allocated to the bill information in the blockchain network for storage, so that after detecting the bill information and the e-bill number, the billing initiator generates the e-bill from the bill information and the e-bill number based on an e-bill template of a billing regulator.

Optionally, a storage address of the e-bill template of the billing regulator is further stored in the blockchain network; and the publishing module 704 is configured to publish the bill information and the e-bill number allocated to the bill information to the blockchain network for storage, so that after detecting the bill information and the e-bill number, the billing initiator obtains the storage address of the e-bill template of the billing regulator from the blockchain network, obtains the e-bill template from a server of the billing regulator based on the storage address, and generates the e-bill from the bill information and the e-bill number.

Optionally, the apparatus further includes a first generation module 705 (not shown in FIG. 7), configured to invoke billing logic in the smart contract deployed in the blockchain network, to generate the e-bill from the bill information and the e-bill number based on an e-bill template of a billing regulator stored in the blockchain network, and publish the generated e-bill in the blockchain network for storage.

Optionally, the network node in the blockchain network is connected to a server of a billing regulator by using an oracle; and the apparatus further includes a second generation module 706 (not shown in FIG. 7), configured to invoke billing logic in the smart contract deployed in the blockchain network, obtain an e-bill template from the server of the billing regulator by using the oracle, generate the e-bill from the bill information and the e-bill number based on the e-bill template obtained, and publish the generated e-bill in the blockchain network for storage.

Optionally, the bill information includes a bill type of the e-bill, and available number segments corresponding to bill types that can be issued by the biller of the e-bill are maintained in the blockchain account corresponding to the biller; and the allocation unit 703 is configured to determine an available number segment corresponding to a bill type of the e-bill to be issued from the available e-bill number segments maintained in the blockchain account corresponding to the biller of the e-bill; and allocate the e-bill number to the bill information from the determined available number segment.

Optionally, the validity check includes at least one of checking permission of the billing initiator and checking billing permission of the biller.

Optionally, the blockchain is a consortium blockchain, and consortium members in the consortium blockchain include a financial institution serving as a billing regulator and a billing institution serving as a biller.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, a computer includes one or more processors (CPU), input/output interface(s), network interface(s), and memory(ies).

The memory may include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer readable instruction, a data structure, a program module, or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by the computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

Terms used in one or more implementations of the present specification are merely used to describe specific implementations, and are not intended to limit the one or more implementations of the present specification. The terms "a" and "the" of singular forms used in one or more implementations of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in one or more implementations of the present specification to describe various types of information, the information is not limited to these terms. These terms are only used to differentiate between information of the same type. For example, without departing from the scope of one or more implementations of the present specification, first information can also be referred to as second information, and similarly, the second information can be referred to as the first information. Depending on the context, for example, the word "if" used here can be explained as "while", "when", or "in response to determining".

The previous descriptions are only example implementations of one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

What is claimed is:

1. A computer-implemented method for blockchain-based bill number allocation, comprising:
   performing, by a network node in a blockchain network:
      receiving a target transaction sent by a billing initiator, wherein the target transaction comprises bill information of an e-bill to be issued;
      in response to the target transaction, invoking check logic in a smart contract deployed in the blockchain network, and performing validity check on the bill information; and
      in response to determining that the validity check succeeds:
         invoking allocation logic in the smart contract; and
         allocating an e-bill number to the bill information from available e-bill number segments maintained in a blockchain account corresponding to a biller of the e-bill,
   wherein the network node in the blockchain network is connected to a server of a billing regulator by using an oracle, wherein the oracle facilitates synchronizing data on the server of the billing regulator outside the blockchain network to the blockchain network to implement data exchange and conversion of assets between the blockchain network and the real world, and further comprises:
      invoking billing logic in the smart contract deployed in the blockchain network;
      obtaining an e-bill template from the server of the billing regulator by using the oracle;
      generating the e-bill from the bill information and the e-bill number based on the e-bill template; and
      publishing the e-bill in the blockchain network for storage.

2. The computer-implemented method according to claim 1, wherein:
   the bill information comprises a bill type of the e-bill and the blockchain account corresponding to the biller maintains available number segments corresponding to bill types that are issued by the biller of the e-bill; and
   allocating the e-bill number to the bill information from the available e-bill number segments maintained in the blockchain account corresponding to the biller of the e-bill comprises:
      determining an available number segment corresponding to a bill type of the e-bill to be issued from the available e-bill number segments maintained in the blockchain account corresponding to the biller of the e-bill; and
      allocating the e-bill number to the bill information from the available number segment.

3. The computer-implemented method according to claim 1, wherein the validity check comprises one or both of checking permission of the billing initiator or checking billing permission of the biller.

4. The computer-implemented method according to claim 1, wherein the blockchain network is a consortium blockchain network, and consortium members in the consortium blockchain network comprise a financial institution serving as the billing regulator and a billing institution serving as the biller.

5. A computer-implemented apparatus for blockchain-based bill number allocation deployed in a network node in a blockchain network, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving a target transaction sent by a billing initiator, wherein the target transaction comprises bill information of an e-bill to be issued;
      in response to the target transaction, invoking check logic in a smart contract deployed in the blockchain network, and performing validity check on the bill information; and
      in response to determining that the validity check succeeds, invoking allocation logic in the smart contract, and allocating an e-bill number to the bill information from available e-bill number segments maintained in a blockchain account corresponding to a biller of the e-bill,
   wherein the network node in the blockchain network is connected to a server of a billing regulator by using an oracle, wherein the oracle facilitates synchronizing data on the server of the billing regulator outside the blockchain network to the blockchain network to implement data exchange and conversion of assets between the blockchain network and the real world; and the operations further comprise:
      invoking billing logic in the smart contract deployed in the blockchain network;
      obtaining an e-bill template from the server of the billing regulator by using the oracle;
      generating the e-bill from the bill information and the e-bill number based on the e-bill template obtained; and
      publishing the e-bill in the blockchain network for storage.

6. The computer-implemented apparatus according to claim 5, wherein:
   the bill information comprises a bill type of the e-bill and the blockchain account corresponding to the biller maintains available number segments corresponding to bill types that are issued by the biller of the e-bill; and
   allocating the e-bill number to the bill information from the available e-bill number segments maintained in the blockchain account corresponding to the biller of the e-bill comprises:
      determining an available number segment corresponding to a bill type of the e-bill to be issued from the available e-bill number segments maintained in the blockchain account corresponding to the biller of the e-bill; and
      allocating the e-bill number to the bill information from the available number segment.

7. The computer-implemented apparatus according to claim 5, wherein the validity check comprises one or both of checking permission of the billing initiator or checking billing permission of the biller.

8. The computer-implemented apparatus according to claim 5, wherein the blockchain network is a consortium blockchain network, and consortium members in the consortium blockchain network comprise a financial institution serving as the billing regulator and a billing institution serving as the biller.

9. A non-transitory, computer-readable medium storing one or more instructions executable by a computer system deployed in a network node in a blockchain network to perform operations for blockchain-based bill number allocation, comprising:

receiving a target transaction sent by a billing initiator, wherein the target transaction comprises bill information of an e-bill to be issued;

in response to the target transaction, invoking check logic in a smart contract deployed in the blockchain network, and performing validity check on the bill information; and in response to determining that the validity check succeeds, invoking allocation logic in the smart contract, and allocating an e-bill number to the bill information from available e-bill number segments maintained in a blockchain account corresponding to a biller of the e-bill, wherein the network node in the blockchain network is connected to a server of a billing regulator by using an oracle, wherein the oracle facilitates synchronizing data on the server of the billing regulator outside the blockchain network to the blockchain network to implement data exchange and conversion of assets between the blockchain network and the real world; and the operations further comprise:

invoking billing logic in the smart contract deployed in the blockchain network;

obtaining an e-bill template from the server of the billing regulator by using the oracle;

generating the e-bill from the bill information and the e-bill number based on the e-bill template obtained; and publishing the e-bill in the blockchain network for storage.

10. The non-transitory, computer-readable medium to claim 9, wherein:

the bill information comprises a bill type of the e-bill and the blockchain account corresponding to the biller maintains available number segments corresponding to bill types that are issued by the biller of the e-bill; and allocating the e-bill number to the bill information from the available e-bill number segments maintained in the blockchain account corresponding to the biller of the e-bill comprises:

determining an available number segment corresponding to a bill type of the e-bill to be issued from the available e-bill number segments maintained in the blockchain account corresponding to the biller of the e-bill; and allocating the e-bill number to the bill information from the available number segment.

11. The non-transitory, computer-readable medium to claim 9, wherein the validity check comprises one or both of checking permission of the billing initiator or checking billing permission of the biller.

12. The non-transitory, computer-readable medium to claim 9, wherein the blockchain network is a consortium blockchain network, and consortium members in the consortium blockchain network comprise a financial institution serving as the billing regulator and a billing institution serving as the biller.

* * * * *

UNITED STATES PATENT AND TRADEMARK OFFICE
CERTIFICATE OF CORRECTION

PATENT NO. : 10,789,628 B2  
APPLICATION NO. : 16/783094  
DATED : September 29, 2020  
INVENTOR(S) : Longsheng Qing et al.

Page 1 of 1

It is certified that error appears in the above-identified patent and that said Letters Patent is hereby corrected as shown below:

In the Claims

Column 22, Line 7, Claim 10, delete "medium" and insert -- medium according --, therefor.

Column 22, Line 24, Claim 11, delete "medium" and insert -- medium according --, therefor.

Column 22, Line 28, Claim 12, delete "medium" and insert -- medium according --, therefor.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*